US009167616B2

(12) United States Patent
Elizarov et al.

(10) Patent No.: US 9,167,616 B2
(45) Date of Patent: Oct. 20, 2015

(54) SYSTEM, APPARATUS AND METHOD FOR ESTABLISHING A CALL FROM A MOBILE DEVICE

(71) Applicant: BlackBerry Limited, Waterloo (CA)

(72) Inventors: Michael Elizarov, Waterloo (CA); Ximing Zeng, Waterloo (CA); Christopher Edward Prest, Waterloo (CA)

(73) Assignee: BlackBerry Limited, Waterloo (CA)

( * ) Notice: Subject to any disclaimer, the term of this patent is extended or adjusted under 35 U.S.C. 154(b) by 81 days.

(21) Appl. No.: 13/667,234

(22) Filed: Nov. 2, 2012

(65) Prior Publication Data

US 2014/0126427 A1    May 8, 2014

(51) Int. Cl.
*H04L 12/16* (2006.01)
*H04W 76/02* (2009.01)
*H04L 29/06* (2006.01)
*H04M 7/12* (2006.01)

(52) U.S. Cl.
CPC ......... *H04W 76/027* (2013.01); *H04L 65/1006* (2013.01); *H04L 65/1046* (2013.01); *H04L 65/1053* (2013.01); *H04L 65/1069* (2013.01); *H04L 69/28* (2013.01); *H04M 7/127* (2013.01)

(58) Field of Classification Search
CPC ..... H04W 80/04; H04W 84/12; H04W 36/18; H04L 12/66; H04L 2012/46; H04L 2012/5618
USPC ......... 370/259, 331, 401, 400, 274, 276, 310, 370/310.2, 311, 315, 324, 328, 338, 389, 370/395.52
See application file for complete search history.

(56) References Cited

U.S. PATENT DOCUMENTS

| | | | |
|---|---|---|---|
| 7,499,458 B2 * | 3/2009 | McDysan et al. | 370/396 |
| 2007/0064909 A1 | 3/2007 | Levy et al. | |
| 2007/0070948 A1 * | 3/2007 | Kezys et al. | 370/331 |
| 2007/0165833 A1 | 7/2007 | Wolter et al. | |

(Continued)

FOREIGN PATENT DOCUMENTS

EP    2224719 A1    9/2010

OTHER PUBLICATIONS

European Search Report from corresponding EP application No. 12191132.5 dated May 21, 2013.

(Continued)

*Primary Examiner* — Chi H Pham
*Assistant Examiner* — Alexander O Boakye
(74) *Attorney, Agent, or Firm* — Moffat & Co.

(57) ABSTRACT

A system, method and mobile device for initiating a voice call from the mobile device is provided. An expiration time is determined based on a time reference synchronized with a mobile call server. The mobile device transmits to the mobile call server a session initiation protocol (SIP) call initiation request including a destination number and the expiration time. A second call initiation request to a secondary contact number is initiated to establish the voice call to the destination number, when a response to the SIP call initiation request is not received from the mobile call server prior to the expiration time enabling reliable establishment of the voice call when the first attempt is unsuccessful. The mobile device does not have to wait on the mobile call server to determine a call failure and ensure that subsequent call initiation by the mobile device does not result in a call establishment collision with the mobile call server.

21 Claims, 7 Drawing Sheets

(56) References Cited

U.S. PATENT DOCUMENTS

2008/0279362 A1* 11/2008 Yasrebi et al. ........... 379/221.06
2012/0230487 A1 9/2012 Leung et al.

OTHER PUBLICATIONS

Canadian Intellectual Property Office, Office Action, Application No. 2832089, Apr. 9, 2015.

* cited by examiner

SYSTEM, APPARATUS AND METHOD FOR ESTABLISHING A CALL FROM A MOBILE DEVICE

TECHNICAL FIELD

The current application relates to establishing a voice call from a mobile device, and in particular to establishing the voice call using a plurality of call establishment procedures.

BACKGROUND

Mobile phones capable of establishing Voice over Internet Protocol (VoIP) calls can provide additional features to users. VoIP calls are generally established by transmitting a Session Initiation Protocol (SIP) message, namely a SIP INVITE message, to a SIP server. The SIP server can then process the initiation message, which may include sending the INVITE message to a destination device. The destination device and the mobile device can then exchange information for exchanging media streams, which effectively establish the call.

The SIP server may also provide additional functionality, such as allowing a mobile device to establish a call from within a local network. The mobile device can send an initiation request to the SIP server, which may then cooperate with a private branch exchange (PBX) device to establish the call. The PBX may contact the mobile device to establish a first call leg, and contact the destination number to establish a second call leg. The PBX may then connect the two call legs to establish the call. For the called party, the call can appear to originate from PBX as opposed to the mobile device, which can allow the mobile phone to place a call that appears to come from a different number, such as a work number, while using their mobile device.

However, the use of SIP to establish a call from the mobile device may result in a prolonged call setup time, which may be undesirable. If the SIP INVITE message, which will cause the PBX to contact the mobile phone, is delayed in transit due to poor network connections or a congested network, the mobile device will have to wait until the INVITE message is received and the PBX contacts the mobile device. One attempted solution to improve the call setup time is to have the mobile device attempt to establish the call by contacting the PBX if it has not received a response to the initiation request for a predetermined period of time.

Attempting to contact the PBX if no response has been received for a period of time may provide a shorter call setup time, however, if the INVITE message is eventually received and the PBX attempts to contact the mobile device as the mobile device is attempting to contact the PBX causing a possible call establishment collision on the cellular network. Therefore there is a need for an improved call establishment procedure for mobile devices.

BRIEF DESCRIPTION OF THE DRAWINGS

A system, apparatus and method for establishing a call from a mobile device will be described with reference to the appended drawings, in which:

FIG. 7 depicts a mobile device for establishing a call from.

DETAILED DESCRIPTION

In accordance with the present disclosure there is provided a method of initiating a voice call from a mobile device, the method comprising: determining an expiration time based on a time reference synchronized with a mobile call server; transmitting to the mobile call server a session initiation protocol (SIP) call initiation request including a destination number and the expiration time; and transmitting a second call initiation request to a secondary contact number, to establish the voice call to the destination number, when a response to the SIP call initiation request is not received from the mobile call server prior to the expiration time.

In accordance with the present disclosure there is provided a mobile device for establishing a voice call, the mobile device comprising: a processor for executing instructions; a memory coupled to the processor and for storing instructions, which when executed by the processor configure the mobile device to: determine an expiration time based on a time reference synchronized with a mobile call server; transmit to the mobile call server a session initiation protocol (SIP) call initiation request comprising a destination number and the expiration time; and transmit a second call initiation request to a secondary contact number, to establish the voice call to the destination number, when a response to the SIP call initiation request is not received from the mobile call server prior to the expiration time.

In accordance with yet another aspect of the present disclosure there is provided a system for establishing a voice call from a mobile device, the system comprising: a mobile device for establishing a call, the mobile device comprising: a processor for executing instructions; a memory coupled to the processor and for storing instructions, which when executed by the processor configure the mobile device to: determine an expiration time based on a time reference synchronized with a mobile call server; transmit to the mobile call server a session initiation protocol (SIP) call initiation request comprising a destination number and the expiration time; and transmit a second call initiation request to a secondary contact number, to establish the voice call to the destination number, when a response to the SIP call initiation request is not received from the mobile call server prior to the expiration time; and the mobile call server comprising: a processor for executing instructions; a memory coupled to the mobile call server processor and for storing instructions, which when executed by the processor configure the mobile call server to: receive the SIP call initiation request; extract the expiration time from the SIP initiation request; determine if the expiration time has expired; and discard the SIP call initiation request if the expiration time has expired.

As described herein, a mobile device can establish a call to a destination number using one of a plurality of possible connection techniques. The mobile device may first attempt to establish the call by sending an initial call establishment request to a mobile call server over a data network. If the mobile call server receives the request it can cooperate with a public branch exchange (PBX) device in order to contact the mobile device in order to establish a first call leg and the destination number in order to establish a second call leg. The two call legs can then be connected together in order to establish the call between the mobile device and the destination number. If the mobile call server does not receive the SIP initiation request, the PBX will not contact the mobile device, and the mobile device will continue to wait for the connection to be established. Eventually the mobile device may stop waiting for the PBX to contact it, and instead the mobile device may contact the PBX in an attempt to establish the call. When connecting to the PBX, the mobile device may connect using a number associated at the PBX with the mobile call server. After the call leg between the mobile device and the PBX is established, the PBX may pass the initiation request received from the mobile device to the mobile call server. The mobile call server may then cooperate with the PBX in order to determine the destination number to establish a second call leg with the destination number, which can then be connected to the first call leg to establish the call.

Figure 1:
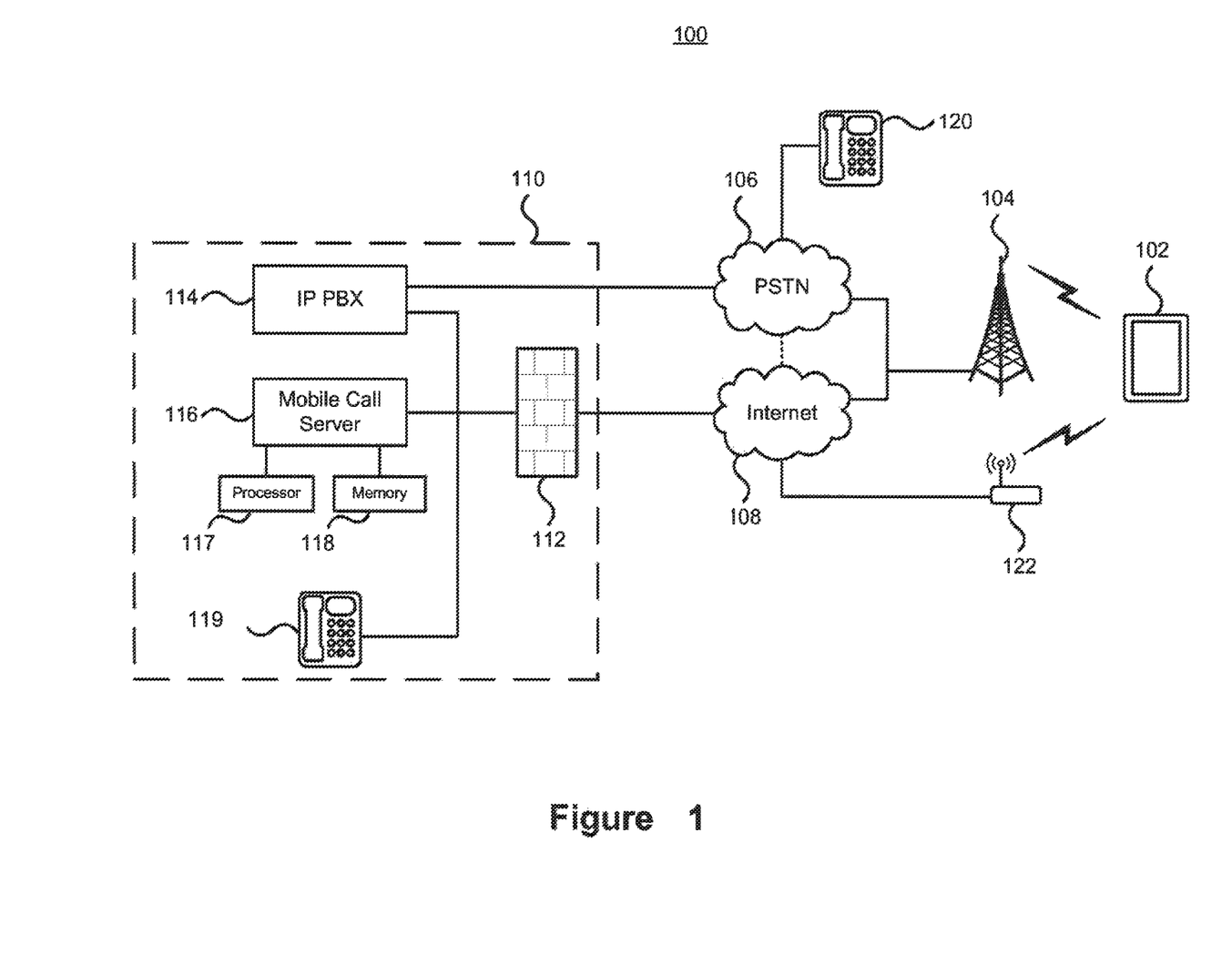
FIG. 1 depicts an environment in which a mobile device may establish a call.

FIG. 1 depicts an environment in which the mobile device call establishment may be used. The environment 100 includes a mobile device 102, such as a smartphone, that is capable of communicating wirelessly using a cellular or mobile wireless infrastructure 104. The cellular infrastructure 104 allows the mobile device 102 to transmit voice as well as data. The voice information may be carried over a public switched telephone network (PSTN) 106 or over a data network such as the Internet 108. The cellular infrastructure 104 may use the Internet 108 to transfer data to and from the mobile device 102.

An internal network 110 may be connected to both the PSTN 106 and the Internet 108. The internal network 110 may be, for example a corporate network. A firewall 112 may control data that can be transferred between the internal network 110 and the Internet 108. Although not depicted in FIG. 1, the firewall 112 may also control data transferred between the PTSN 106 and the internal network 110. The internal network may comprise an Internet Protocol (IP) Personal Branch Exchange (PBX) 114. The IP PBX 114 provides telephone functionality for the internal network 110. The IP PBX 114 can establish telephone calls using traditional switched circuits or using voice over IP (VoIP). The IP PBX 114 may be associated with one or more incoming and outgoing telephone lines or telephone numbers. The IP PBX 114 may allow a plurality of internal phone numbers to be multiplexed onto a phone line. The IP PBX 114 may receive commands for establishing and controlling phone calls. The commands may be received over the PSTN 106 or over the internal network 110, or Internet 108.

The internal network 110 may further comprise a mobile call server 116. Although depicted as a separate component, the functionality of the mobile call server 116 may be incorporated into the IP PBX 114, or alternatively another component of the internal network. Further, the functionality of the mobile call server 116 could be provided by a component that is external to the internal network 116. The mobile call server 116 comprises at least a processor 117 and memory 118 providing instructions for performing call connectivity, verification and routing. The internal network 110 may include one or more telephones 119. Each telephone 119 is associated with a number or extension number so that the IP PBX 114 can connect with the telephone 119. The mobile call server 116 may provide functionality that allows a mobile device, such as mobile device 102, to operate as if it were a phone coupled to the internal network 110. The environment 100 may further comprise further telephones 120 connected to the PSTN.

Figure 2:
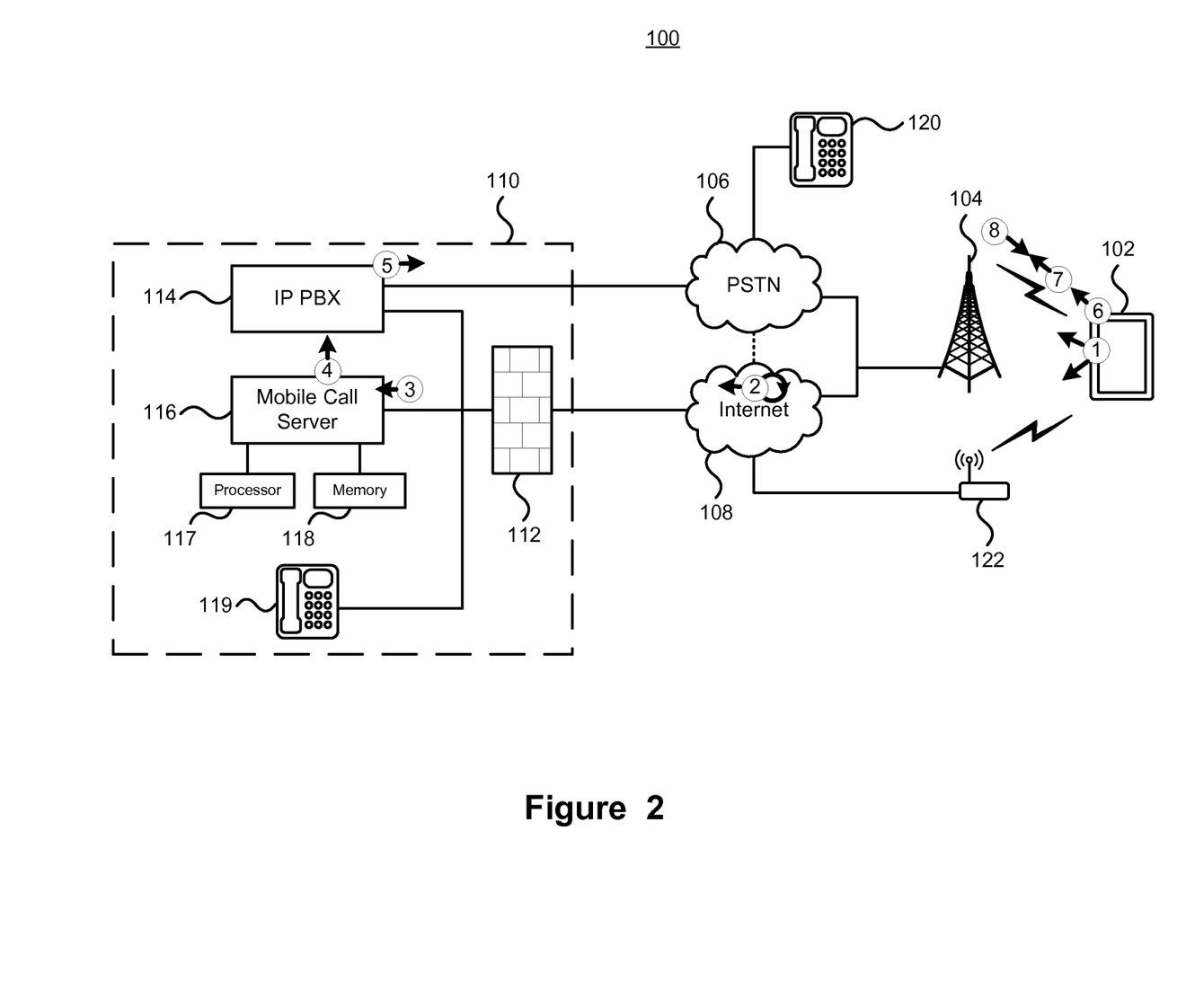
FIG. 2 depicts an undesirable call connection attempt resulting in a collision.

FIG. 2 depicts an undesirable call connection attempt made in the environment of FIG. 1. The call connection attempt depicted in FIG. 2 results in a collision when the mobile device 102 attempts to initiate a call. The mobile device 102 attempts to place a call to a destination through the mobile call server 116. By initiating the call through the mobile call server 116, it is possible to make the call appear as if it is originating from within the local network 110. Additionally, it is possible to take advantage of features provided by the mobile call server 116, the IP PBX 114, or other devices of the internal network. The IP PBX 114 may establish the call between the mobile device 102 and the destination number by establishing a call leg to each and then connecting the two call legs ensuring that calls are routed through the IP PBX 114 for corporate compliance or security reasons. In addition by having the IP PBX 114 contact the mobile device 102 to establish a call leg it may be more cost effective, as some cellular voice plans provide less expensive, or free, incoming calls.

When attempting to establish a call to a destination number, the mobile device 102 prepares and transmits a SIP call initiation message to the mobile call server 116, depicted as reference (1). The message is sent through the internet 108 and may be transmitted from the mobile device 102 using either a cellular data connection provided by the cellular infrastructure 104, or may be transmitted through a local network connection such as provided by a wireless local router 122. Regardless of how the mobile device 102 transmits the SIP call initiation message to the mobile call server 116, the message gets delayed for a period of time in the Internet 108 as depicted by reference (2). The delay may be the result of a congested network or other network conditions in one or more parts of the network. Eventually, the SIP call initiation message is received (3) at the mobile call server 116. Once the mobile call server 116 receives the SIP call initiation message, it cooperates with the IP PBX 114 to attempt to establish two call legs of the call. The mobile call server 116 directs the IP PBX 114 to establish a call leg with the mobile device 102 depicted at reference (4). The IP PBX 114 attempts to establish a call leg (5) with the mobile device 102 over the PSTN 106.

Since the call is established by having the IP PBX 114 call back to the mobile device 102 to establish a call leg, the call cannot proceed until the mobile call server 116 receives the initiation message from the mobile device 102. If the SIP call initiation message from the mobile device 102 is delayed for a prolonged period of time, the mobile device 102 may consider the attempt failed, and may attempt to complete the call using another technique, for example by contacting the IP PBX 114 on a direct inward dialing (DID) number associated with the mobile call server 116. The mobile device 102 prepares the call initiation for the IP PBX at reference (6) and attempts to connect to the IP PBX over the cellular infrastructure at reference (7). However, as the mobile device 102 is attempting to contact the IP PBX over the cellular infrastructure, the IP PBX is also attempting to contact the mobile device over the cellular infrastructure at reference (8) as a result of the delayed SIP call initiation that the mobile device 102 had previously abandoned. Contention will occur between the mobile device 102 initiating a call to the IP PBX 114 and the IP PBX 114 initiating a call to the mobile device 102, further delaying the call establishment or resulting in a call failure.

Figure 3:
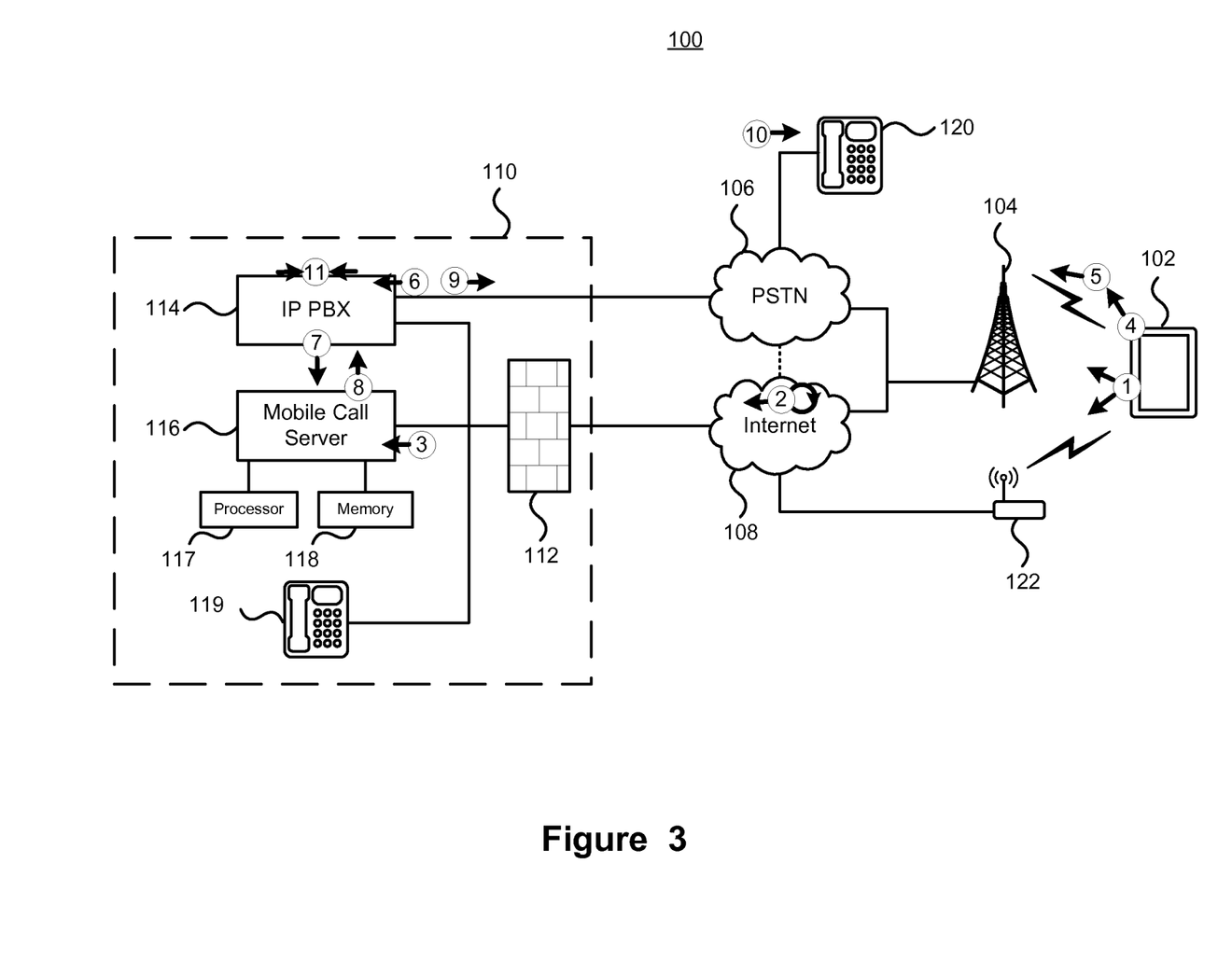
FIG. 3 depicts a collision free call connection attempt.

FIG. 3 depicts a collision free call connection attempt. The process described allows the mobile device to indicate to the mobile call server when it intends to abandon the SIP call initiation attempt. The mobile device synchronizes with the mobile call server to provide a common time reference. The synchronization may be done in various manners, such as through a common time reference such as by a Network Time Protocol (NTP) reference, Global Positioning System reference, or other timing signal available to both the mobile device 102 and the mobile call server 116. The mobile device 102 may synchronize prior to attempting to establish the call, or alternatively, the mobile device 102 may periodically synchronize in order to maintain synchronization with the mobile call server 116.

With the mobile device 102 synchronized to the mobile call server 116, the mobile device 102 transmits a SIP call initiation message to the mobile call server, depicted as (1). The SIP call initiation message may be transmitted over the cellular infrastructure 104, or over a local network infrastructure 122. The mobile device 102 includes a call expiration time in the SIP call initiation message based on the synchronized timer. The call expiration time that the mobile device includes in the SIP call initiation message provides an indication to the mobile call server 116 as to when the mobile device 102 will abandon the call initiation attempt if a connection back to the mobile device 102 is not successful. The call expiration time may be set by the mobile device 102, either as a predetermined amount of time, or based on one or more characteristics or parameters of the call. For example, a long distance call may have a longer call expiration time so that it is more likely to succeed in establishing the call by receiving a call back from the IP PBX 114. A local call may have a shorter call expiration time in order to decrease the possible call setup time. Once the SIP call initiation message with the expiration time is sent, it may be delayed due to network issues as depicted by reference (2). Once the SIP call initiation message is finally received at the mobile call server 116, the mobile call server 116 checks the call expiration time of the received call initiation message to determine if the synchronized time of the mobile call server 116 is past the call expiration time, as depicted by reference (3). Once the call expiration time passes, the mobile device abandons the SIP call establishment attempt and attempts to establish the call by contacting the IP PBX. The mobile device 116 transmits a second call initiation request to the IP PBX 114, as depicted by reference (4). The call initiation may be sent over the PSTN network 106 and the cellular infrastructure 108 as depicted by reference (5). The mobile device 102 may contact the IP PBX 114 on a number associated with the mobile call server 116. The call initiation with the IP PBX 114 may include a destination number for the IP PBX 114 to connect to or may be provided after a connection is established. The call initiation establishes a call leg between the mobile device 102 and the IP PBX 114.

The IP PBX receives the call initiation (6) from the mobile device 102 on a line associated with the mobile call server 116. The call initiation establishes a first call leg between the mobile device 102 and the IP PBX 114. The IP PBX 114 forwards the initiation requests received on the mobile call server line to the mobile call server 116, which determines the destination number (7) and directs the IP PBX 114 to establish a second call leg with the destination number, such as the phone 120 (8). The IP PBX 114 contacts the destination number (9) over the PSTN 106 to establish a second call leg with the destination number. The phone 120 may then receive the call leg setup (10) to complete the call, and once both the first and second call legs are established with the IP PBX 114 the IP PBX 114 can connect the two call legs together to establish the call between the mobile device 102 and the destination phone 120 (11).

Accordingly, by synchronizing a mobile device 102 with the mobile call server 116, it is possible to gracefully cancel or abandon a call establishment without concern of subsequent action of the mobile call center from interfering with further actions of the mobile device 102 when processing of the initial request is delayed. Additionally, it may be possible for the mobile device 102 to specify how long it will continue the SIP call initiation process, and the time used for the initiation may be set based on various situations, including the type of call being placed, the destination number being called, the time of the day, etc.

Figure 4:
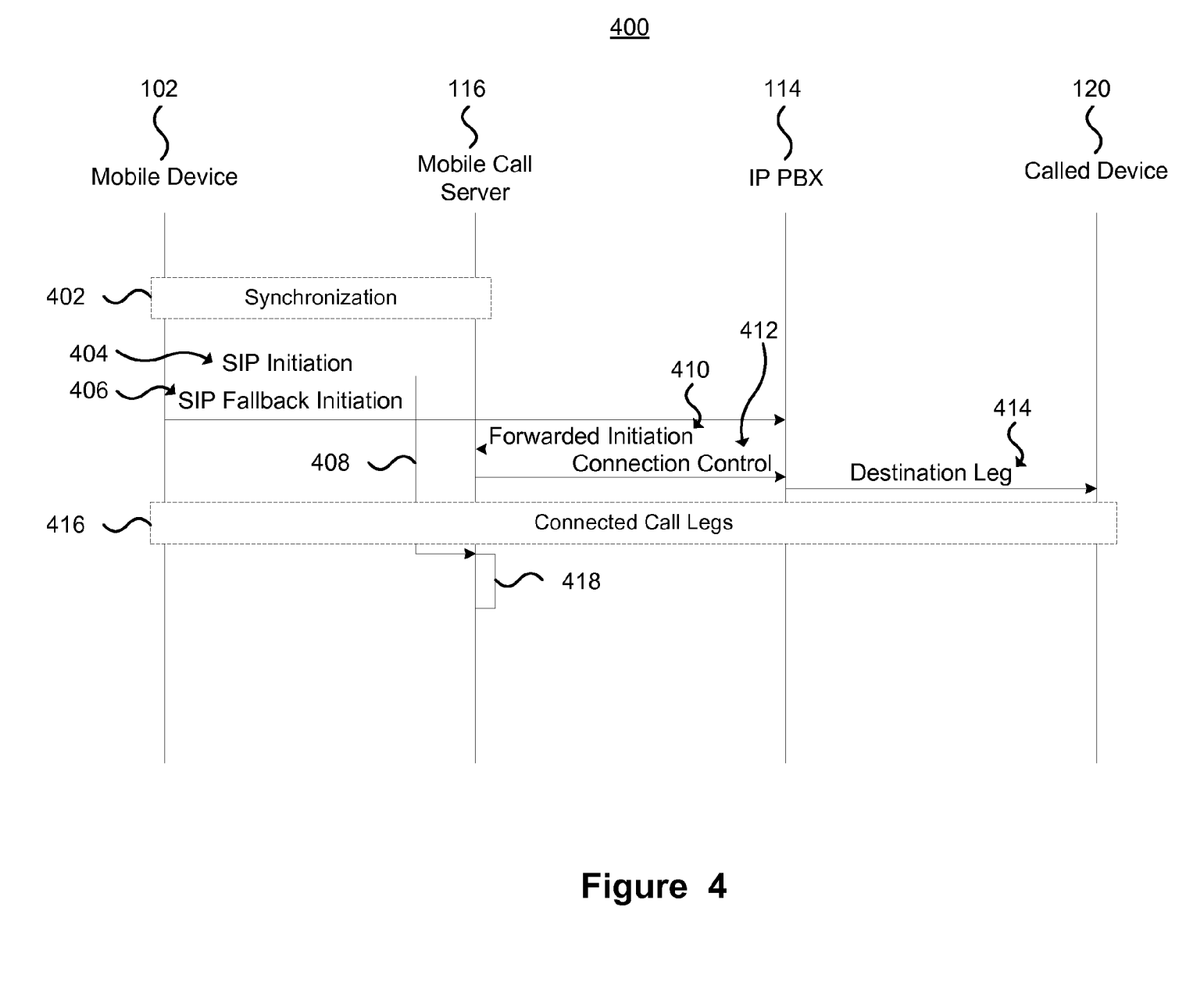
FIG. 4 depicts a message flow of the collision free call connection attempt of FIG. 3.

FIG. 4 depicts a message flow of the collision free call connection attempt of FIG. 3. The messages are depicted as being sent between the mobile device 102, the IP PBX 114, mobile call server 116 and the called device 120. The mobile device 102 and the mobile call server 116 synchronize to a common time reference (402). As described above, the synchronization may be achieved using one or more known synchronization techniques. The mobile device 102 sends a SIP initiation message 404 to the mobile call server 116; however the SIP call initiation message is delayed (408) for a prolonged period of time. Eventually, the initial SIP call initiation message is received and the mobile call server 116 then determines the expiration time in the initiation request and determines if the time expiration has passed, and if it has the initiation request is discarded or dropped (418). The mobile device 102 abandons the SIP call initiation before the mobile call server 116 receives the SIP call initiation message, or has been able to initiate the outbound call leg by the IP PBX 114. After abandoning the SIP call initiation the mobile device 102 attempts to establish the call using direct inward dialing (DID) to the mobile call server 116. The mobile device 102 transmits a DID call initiation message to the IP PBX 114 (406) and provides the destination number which the mobile device 102 was trying to establish a connection with. The IP PBX 114 receives the DID call initiation message and establishes a first call leg with mobile device 102. The mobile device 102 may send the DID call initiation message to a voice line of the IP PBX that is associated with the mobile call server 116. The IP PBX 114 receives the DID call initiation and establishes a first call leg with the mobile device 102. The IP PBX 116 forwards the DID initiation message to the mobile call server 116 (410), which receives the DID initiation message, verifies the originating device or user and determines the destination number. The mobile call server 116 determines the destination number and directs the IP PBX 114 to establish a second call leg with the destination number. The IP PBX 114 establishes the destination leg with the called device 120 (414). Once the first and second call legs are established, the IP PBX connects the two call legs (416).

Figure 5:
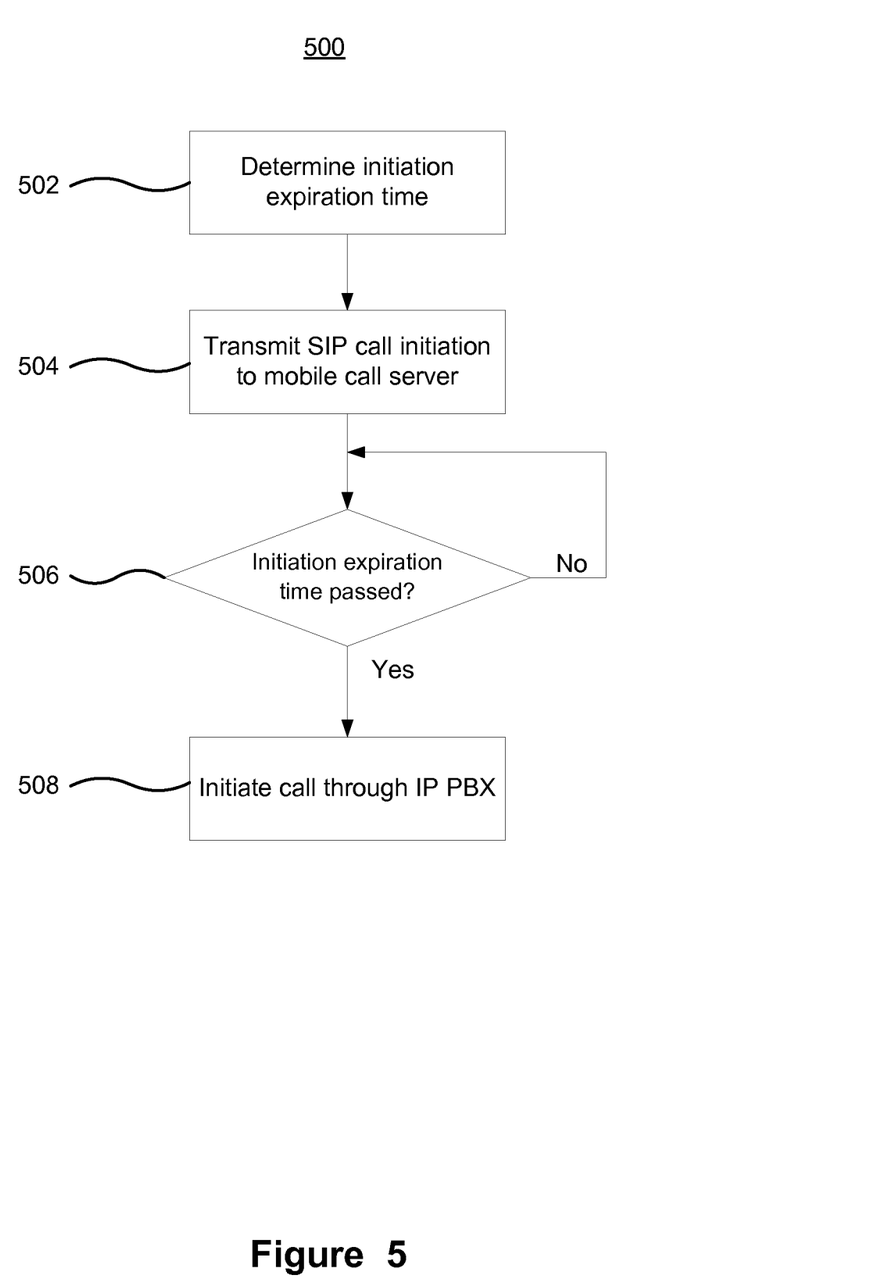
FIG. 5 depicts a method of establishing a call from a mobile device.

FIG. 5 depicts a method of establishing a call from a mobile device. The method 500 may be performed at the mobile device 102. The method begins with the mobile device 102 determining an expiration time (502) when a voice call is initiated from the mobile device 102. The method assumes that the mobile device 102 and the mobile call server have a synchronized time reference so that the expiration time is relative to the same time reference at both the mobile device 102 and the mobile call server 116. The mobile device 102 may synchronize the time reference periodically, or if an error in the time reference is above a threshold. The mobile device 102 may determine the initiation expiration time according to a predetermined or preset duration that is acceptable for waiting to setup the call. Alternatively, the mobile device 102 may determine the initiation expiration time based on various factors, including for example a time of the call, the destination number being called, a geographic location of the device, available network connections or other considerations. In determining the initiation expiration time, the mobile device can balance the desire to have an inexpensive call, which would favor a long initiation time to allow the call to proceed through a preferred first setup procedure such as a call back initiated call, and the desire to have a fast call setup, which would favor having a short initiation time in order to quickly change to another call setup procedure to attempt to setup the call.

Once the initiation expiration time is determined, the mobile device 102 transmits a SIP call initiation to the mobile call server 114 (504). The method then determines if the expiration time has passed (506). The call initiation expiration time expires before no response has been received from the mobile call server 116 indicating that the call is in progress, or if the IP PBX 114 has initiated a call leg with the mobile device 102. If the call initiation expiration time has not passed (No at 506), that is no response has been received from the mobile call server 116 or the IP PBX 114 and the call initiation expiration time has not passed, the method 500 may continue waiting, either for a response or for the expiration time to pass. If the call expiration time has passed (Yes at 506), that is no response has been received, the mobile device 102 abandons the SIP call initiation with the mobile server 116 and attempts to establish the call in another way by transmitting a call initiation to the IP PBX 114 (508).

As described above, the call establishment method allows a preferred method of call establishment to be first attempted for a period of time, and then to switch to a second call establishment method without having to possibly contend with the first connection attempt succeeding after a delayed period of time. Further, since the mobile device is able to specify to the mobile call server when it will fall back to the second connection attempt, the mobile device is able to change the amount of time it will wait before falling back to the next connection method. As such, it is possible to allow a user to adjust preferences that balance the call setup time with the likelihood of successfully setting up the call using the first, or preferred, call establishment procedure.

Figure 6:
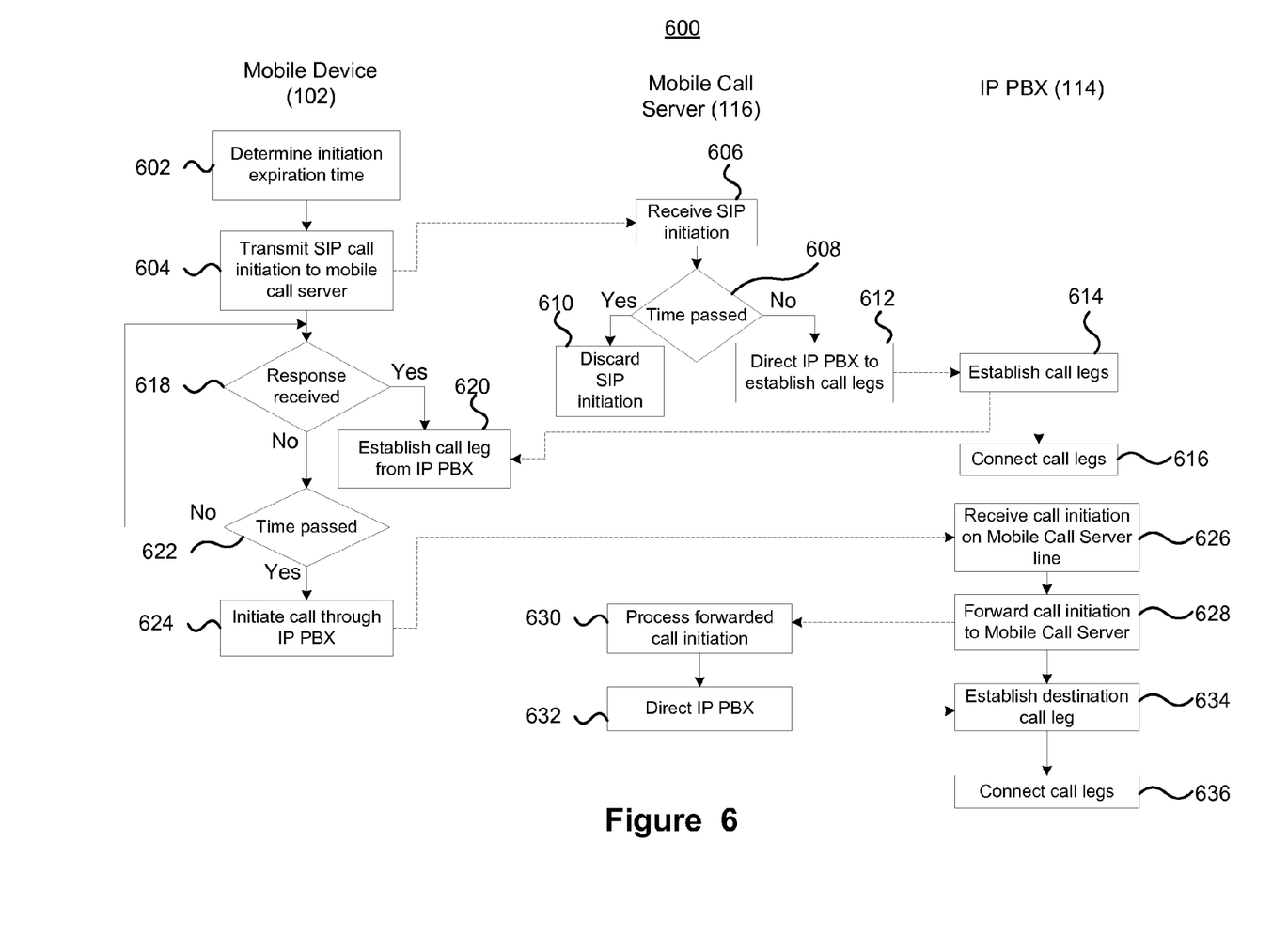
FIG. 6 depicts a further method of establishing a call from a mobile device.

FIG. 6 depicts a further method of establishing a call from a mobile device. The method 600 includes portions performed at the mobile device 102, the mobile call server 116 and the IP PBX 114. The method 600 begins with a user of the mobile device 102, or the mobile device, attempting to establish a call from the mobile device 102 through the IP PBX 114. The mobile device 102 determines an initiation expiration time (602) from a time reference that is synchronized with the mobile call server 116. The mobile device 102 and the mobile call server 116 may synchronize their respective time references independently of each other. The synchronization may be provided in one of a number of ways, Network Time Protocol (NTP), Global Positioning System (GPS), a radio time signal, an Internet based time reference, or other synchronization techniques available to both the mobile device 102 and the mobile call server 116, so that both share a common or relative time reference. Once the mobile device 102 and the mobile call server 116 are synchronized, the mobile device transmits a SIP call initiation message to the mobile call server 116 (604). The SIP call initiation message includes information on the destination number or address to establish the call with, as well as an indication of when the mobile device will abandon the call initiation attempt. The SIP call initiation message may be a SIP INVITE message that is modified to include the call initiation expiration time. Further, the call initiation may be the result of a new call, or alternatively may be an attempt to transfer an in progress call from one communication network, such as a data network, to a cellular network, or vice versa, allowing an in-progress call to be handed off. Regardless of if the call initiation is to establish a new call or handoff an existing call, an appropriate SIP call control message is transmitted from the mobile device 102 to the mobile call server 116.

The mobile call server 116 receives a SIP call initiation message (606) and extracts the expiration time to determine if the expiration time has passed (608). If the time has passed (Yes at 608) the mobile call server 116 can simply ignore, discard, or drop the received SIP call initiation (610). If however the initiation expiration time has not passed (No at 608), the mobile call server 116 processes the SIP call initiation. The mobile call server 116 co-operates with the IP PBX 114 in order to establish the call between the mobile device 102 and the destination number or address. The mobile call server 116 can direct the IP PBX 114 to establish call legs (612) with the mobile device 102 and destination number and then to connect the two legs. The IP PBX 114 establishes the call legs with the mobile device 102 and the destination number (614). Once the call legs are established with each end of the call, the IP PBX 114 may connect the two call legs to establish the call (616).

Once the mobile device 102 transmits the SIP call initiation message (604) it checks to determine if a response has been received (618). A response may be received from the mobile call server 116 indicating that the call setup is in progress, or alternatively, the response may be the IP PBX 114 attempting to establish the call leg. With a response received, and assuming the response does not indicate that the call cannot be established, the mobile device 102 establishes the call leg with the IP PBX 114 (602), which can then connect the established call leg with the call leg made to the destination number, completing the call setup.

If the mobile device does not receive a response (No at 618), the mobile device determines if the call initiation expiration time transmitted to the mobile call server 116 has passed (622). If the time has not passed (No at 622), the method may then return to waiting for a response (618). If the time has passed (Yes at 622) the mobile device 102 will abandon the first SIP call initiation attempt and attempt to initiate the call through the IP PBX 114 (624). Since the mobile device's time and the mobile call server's time references are synchronized, the mobile device 102 can abandon the call establishment attempt, since if the mobile call server 116 subsequently receives the SIP call initiation message, the mobile call server 116 will ignore the message due to expired call initiation expiration time in the SIP call initiation message.

When initiating the call through the IP PBX the mobile device 102 may connect to the IP PBX 114 using a preconfigured direct inward dialing (DID) number of the IP PBX 114 that is associated with the mobile call server 116. The IP PBX 114 receives the call initiation on the mobile call server line (626), and receives an indication of a dialed destination number (DNIS) which is the destination number the mobile device is attempting to establish a call with. The identity of the mobile device 102 can be verified by the mobile call server 116. The IP PBX 114 establishes a first call leg with the mobile device 104. The DNIS, or other indication of the destination number, received at the IP PBX 114 is forwarded, or otherwise provided, to the mobile call server 116 from the IP PBX 114 (628). The mobile call server 116 processes the forwarded call initiation (630) and directs the IP PBX 114 to establish a call leg to the destination number or address (632). The IP PBX 114 establishes the destination call leg (634) and then connects the two call legs (636) completing the call setup.

As described above, a mobile device may provide additional information in an initial call setup message to indicate when the call setup attempt will be abandoned. As a result, the call attempt can be abandoned and another call setup attempt initiated without concern that the initial call setup attempt will continue in a delayed manner causing potential problems or collisions.

Figure 7:
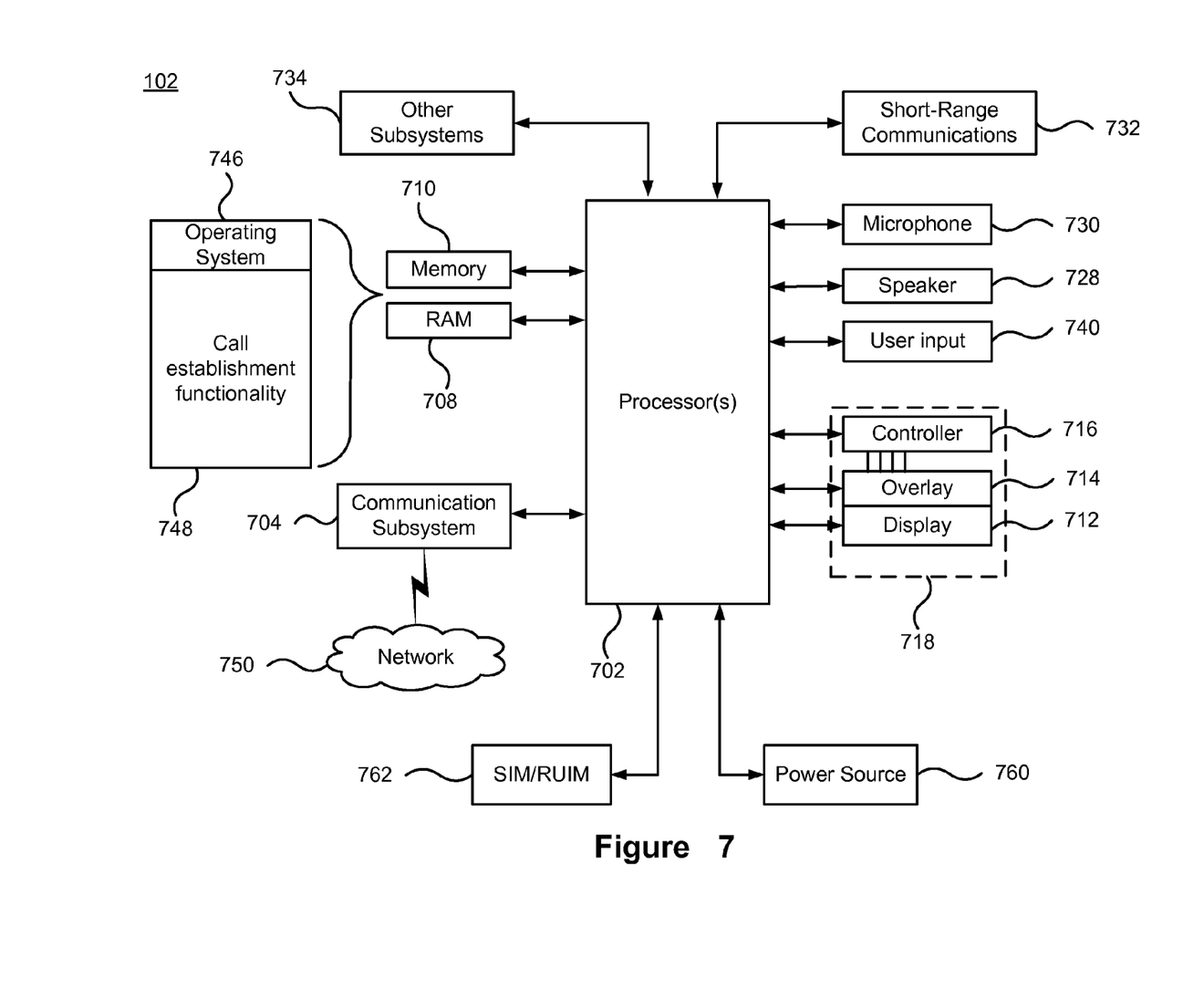

FIG. 7 depicts a mobile device capable of establishing a voice call with destination number through a mobile call server. As shown by way of example in FIG. 7, the mobile device 102, includes a processor (or microprocessor) 702 for executing instructions, including instructions for providing one or more applications, memory in the form of flash memory 710 and RAM 708 (or any equivalent memory devices) for storing an operating system 746 and one or more applications, components or functionalities 748 providing the call establishment functionality described here that allows the mobile device to establish a call using one or more call establishment processes. The processor receives power from a power source 760, which may be a direct connection or provided by a battery source.

As shown by way of example in FIG. 7, the mobile device 102 may include a communication subsystem 704 which provides radiofrequency (RF) transceiver to communicate through a wireless network 750. The mobile device 102 may be in a portable form factor such as a smart phone, tablet, netbook, laptop, ultrabook, portable computing device or an integrated mobile computer device. The mobile device 102 may access wired or wireless networks to transmit and retrieve data. The RF transceiver of the communication subsystem 704 for communication with a wireless network 750 may use wireless communication protocols such as, for example but not limited to, GSM, UMTS, LTE, HSPA, CDMA, W-CDMA, Wi-MAX, Wi-Fi etc. A subscriber identity module (SIM) card 762 may be provided depending on the access technology supported by the device. The communication subsystem 704 may also provide wired communication through a wired network.

The device is a voice-enabled communications device such as, for example, a tablet, smart-phone or cell phone, and further includes a microphone 730 and a speaker 728. Short-range communications 732 may be provided through wireless technologies such as Bluetooth™ or wired Universal Serial Bus™ connections to other peripheries or computing devices or by other device sub-systems 734 which may enable access tethering using communications functions of another mobile device. In a tethering configuration the mobile device 102 may provide the network information associated with the tethered or master device to be used to access the network. The device 102 may optionally include a Global Positioning System (GPS) receiver chipset or other location-determining subsystem. Further the GPS receiver may be used to provide a time synchronization signal.

The operating system 746 and the software components that are executed by the microprocessor 702 are typically stored in a persistent store such as the flash memory 710, which may alternatively be a read-only memory (ROM) or similar storage element (not shown). Those skilled in the art will appreciate those portions of the operating system 746 and the software components, such as specific device applications, or parts thereof, may be temporarily loaded into a volatile store such as the RAM 708. Other software components can also be included, as is well known to those skilled in the art.

User input 740 may be provided by integrated input devices such as a keyboard, touchpad, touch screen, mouse, camera or positing apparatus to actuate transitions. The mobile device 102 may have an integrated touch-sensitive display 718 having a display screen 712, with a touch-sensitive overlay 714 coupled to a controller 716 for enabling interaction with the mobile device 102. The display portion of the mobile device 102 may not necessarily be integrated but may be coupled to the mobile device 102. The mobile device 102 may provide a touch-sensitive GUI interface that uses touch based gestures or may incorporate three-dimensional gestures, for example by using a camera input or three-dimensional input devices.

Although certain methods, apparatus, computer readable memory, and articles of manufacture have been described herein, the scope of coverage of this disclosure is not limited thereto. To the contrary, this disclosure covers all methods, apparatus, computer readable memory, and articles of manufacture fairly falling within the scope of the appended claims either literally or under the doctrine of equivalents.

Although the following discloses example methods, system and apparatus including, among other components, software executed on hardware, it should be noted that such methods, system and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods, system and apparatus.

What is claimed is:

1. A method of initiating a voice call from a mobile device, the method comprising:
   determining an expiration time based on a time reference synchronized with a mobile call server;
   transmitting to the mobile call server a session initiation protocol (SIP) call initiation request including a destination number and the expiration time; and
   transmitting a second call initiation request to a secondary contact number, to establish the voice call to the destination number, when a response to the SIP call initiation request is not received from the mobile call server prior to the expiration time.

2. The method of claim 1, wherein the SIP call initiation request is transmitted using a first communication network and the second call initiation request is transmitted using a second communication network.

3. The method of claim 2, wherein the first communication network is a data communication network and the second communication network is a cellular voice communication network.

4. The method of claim 3, wherein the SIP call initiation request is for initiating a call leg from an Internet Protocol private branch exchange (IP PBX) to the mobile device.

5. The method of claim 4, wherein the second call initiation request establishes a call leg to the secondary contact number.

6. The method of claim 1, wherein the expiration time is set by the mobile device based on one or more of:
   a time of the call;
   the destination number;
   a geographic location of the device; and
   available network connections.

7. The method of claim 1, wherein the second contact number is serviced by an Internet Protocol private branch exchange (IP PBX) which associates the second contact number with the mobile call server.

8. The method of claim 1, further comprising:
   synchronizing the time reference of the mobile device with a mobile call server.

9. The method of claim 1, further comprising:
receiving the SIP call initiation request at the mobile call server;
extracting the expiration time from the SIP initiation request;
determining if the expiration time has expired; and
discarding the SIP call initiation request if the expiration time has expired.

10. The method of claim 1, further comprising:
receiving the SIP call initiation request at the mobile call server;
determining that the expiration time has not expired;
contacting the mobile device to establish a first call leg between an Internet Protocol private branch exchange (IP PBX) and the mobile device;
contacting the destination to establish a second call leg between the IP PBX and the destination; and
connecting the first call leg and the second call leg.

11. The method of claim 1, further comprising:
receiving the second call initiation request from the mobile device at an Internet Protocol private branch exchange (IP PBX) and establishing a first call leg between the mobile device and the IP PBX;
determining a destination number from the second call initiation request;
establishing a second call leg between the IP PBX and the destination; and
connecting the call legs.

12. A mobile device for establishing a voice call, the mobile device comprising:
a processor for executing instructions;
a memory coupled to the processor and for storing instructions, which when executed by the processor configure the mobile device to:
determine an expiration time based on a time reference synchronized with a mobile call server;
transmit to the mobile call server a session initiation protocol (SIP) call initiation request comprising a destination number and the expiration time; and
transmit a second call initiation request to a secondary contact number, to establish the voice call to the destination number, when a response to the SIP call initiation request is not received from the mobile call server prior to the expiration time.

13. The mobile device of claim 12, wherein the SIP call initiation request is transmitted using a first communication network and the second call initiation request is transmitted using a second communication network.

14. The mobile device of claim 13, wherein the first communication network is a data communication network and the second communication network is a cellular voice communication network.

15. The mobile device of claim 12, wherein the SIP call initiation request is for initiating a call leg from an Internet Protocol private branch exchange (IP PBX) to the mobile device.

16. The mobile device of claim 12, wherein the second call initiation request establishes a call leg to the secondary contact number.

17. The mobile device of claim 12, wherein the expiration time is set by the mobile device based on one or more of:
a time of the call;
the destination number;
a geographic location of the device; and
available network connections.

18. The mobile device of claim 12, wherein the instructions when executed by the processor configure the mobile device to:
synchronize the time reference of the mobile device with a mobile call server.

19. A system for establishing a voice call from a mobile device, the system comprising:
a mobile device for establishing a call, the mobile device comprising:
a processor for executing instructions;
a memory coupled to the processor and for storing instructions, which when executed by the processor configure the mobile device to:
determining an expiration time based on a time reference synchronized with a mobile call server;
transmitting to the mobile call server a session initiation protocol (SIP) call initiation request comprising a destination number and the expiration time; and
transmitting a second call initiation request to a secondary contact number, to establish the voice call to the destination number, when a response to the SIP call initiation request is not received from the mobile call server prior to the expiration time; and
the mobile call server comprising:
a processor for executing instructions;
a memory coupled to the mobile call server processor and for storing instructions, which when executed by the processor configure the mobile call server to:
receive the SIP call initiation request;
extract the expiration time from the SIP initiation request;
determine if the expiration time has expired; and
discard the SIP call initiation request if the expiration time has expired.

20. The system of claim 19, further comprising:
an Internet Protocol private branch exchange (IP PBX) comprising:
a processor for executing instructions;
a memory coupled to the IP PBX processor and for storing instructions, which when executed by the processor configure the IP PBX to:
contact the mobile device to establish a first call leg between IP PBX and the mobile device;
contact the destination to establish a second call leg between the IP PBX and the destination; and
connect the first call leg and the second call leg;
wherein the instructions executed by the processor of the mobile call server further configure the mobile call server to:
determine that the expiration time has not expired; and
instruct the IP PBX to establish and connect call legs to the mobile device and destination number.

21. The system of claim 19, further comprising:
an Internet Protocol private branch exchange (IP PBX) comprising:
a processor for executing instructions;
a memory coupled to the IP PBX processor and for storing instructions, which when executed by the processor configure the IP PBX to:

receive the second call initiation request from the mobile device and establish a first call leg between the mobile device and the IP PBX;

forward the second call initiation request to the mobile call server;

establish a second call leg between the IP PBX and the destination number; and connect the call legs; and wherein the instructions executed by the processor of the mobile call server further configure the mobile call server to:

determine the destination number from the forwarded call initiation request; and instruct the IP PBX to establish the call leg to the destination number and connect the call leg to the call leg established with the mobile device.

* * * * *